Jan. 5, 1932.  M. E. PHILLIPS  1,839,258
JUNCTION BOX FOR UNDERFLOOR SYSTEMS
Filed Dec. 12, 1928  3 Sheets-Sheet 1
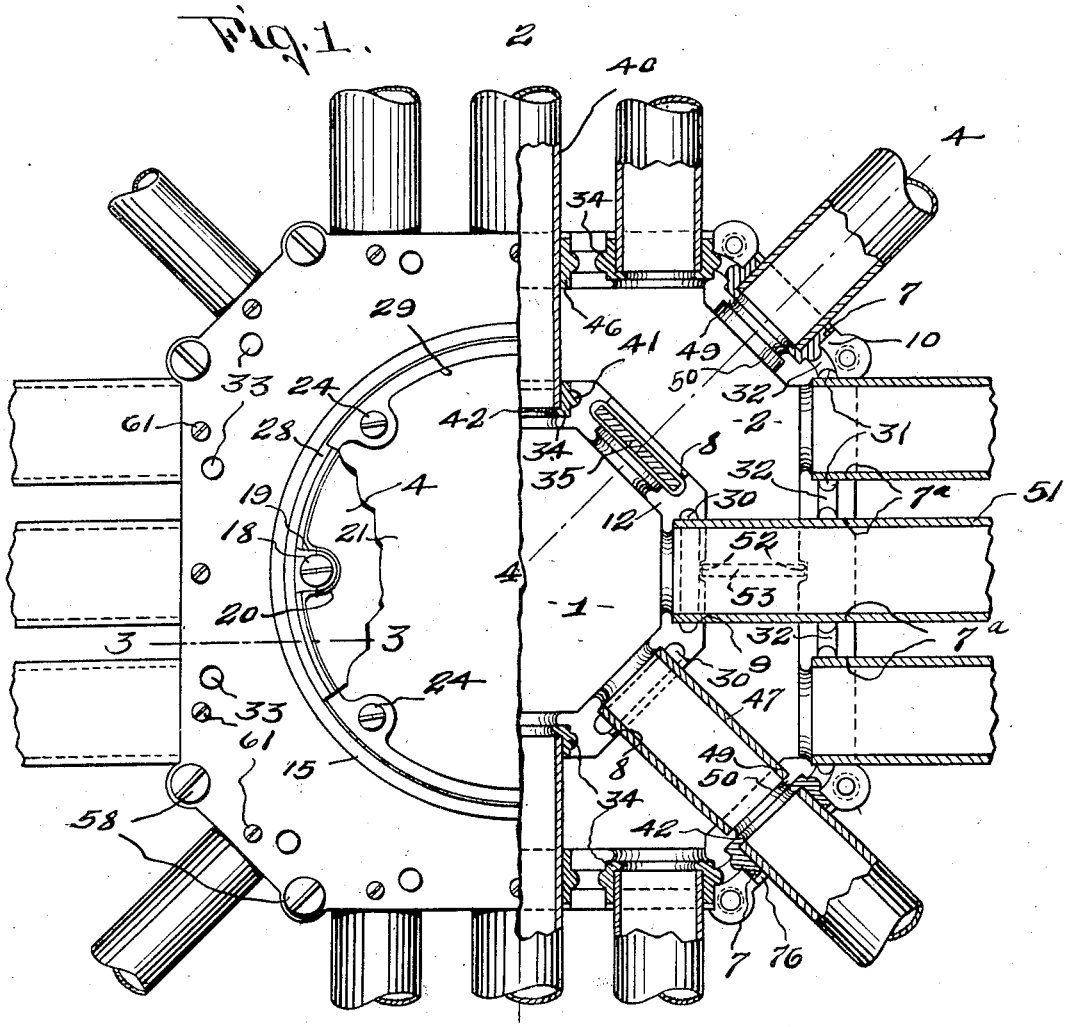
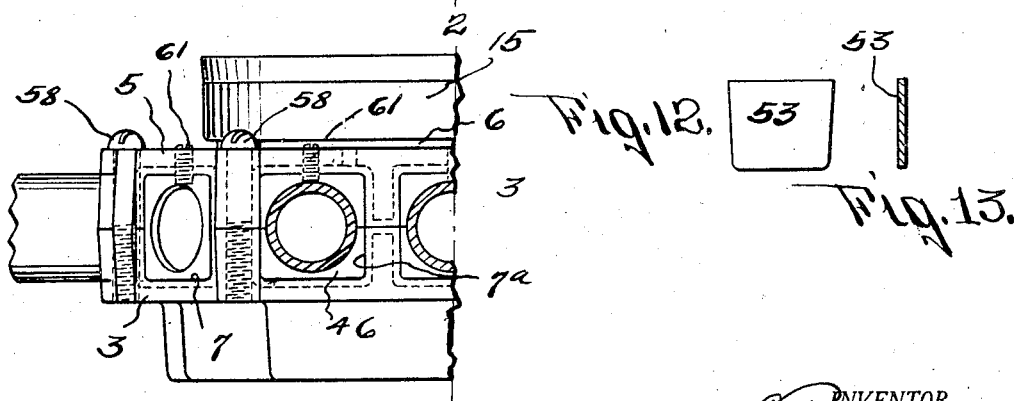
INVENTOR.
Milton E. Phillips
BY Parsons & Bodell
ATTORNEYS.

Jan. 5, 1932. M. E. PHILLIPS 1,839,258
JUNCTION BOX FOR UNDERFLOOR SYSTEMS
Filed Dec. 12, 1928 3 Sheets-Sheet 2
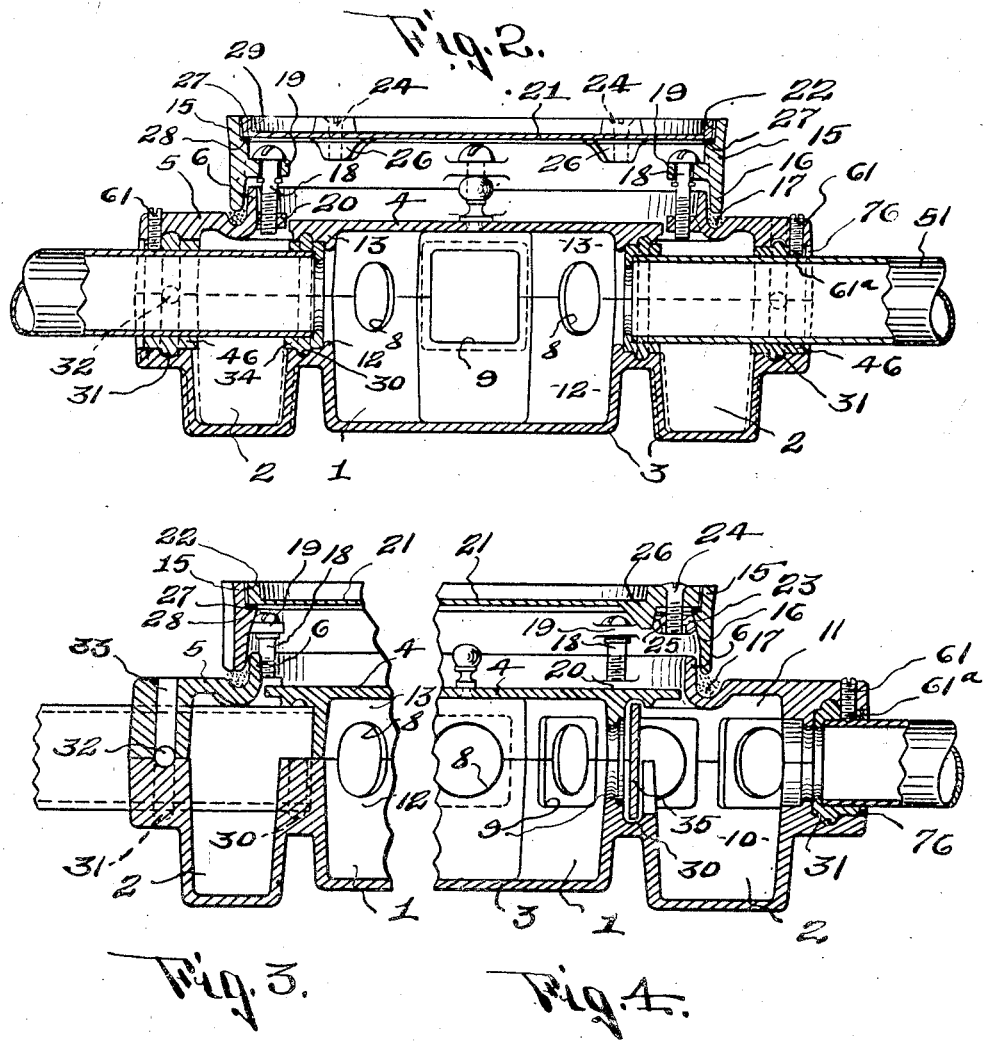
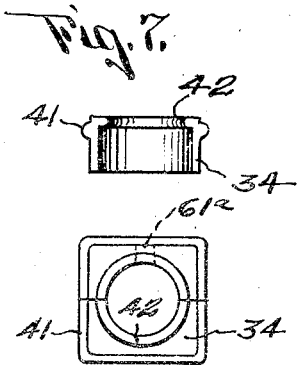
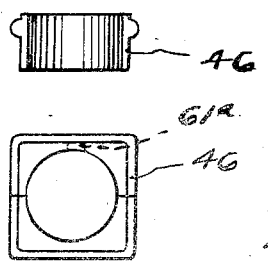
INVENTOR.
Milton E. Phillips
BY
ATTORNEYS.

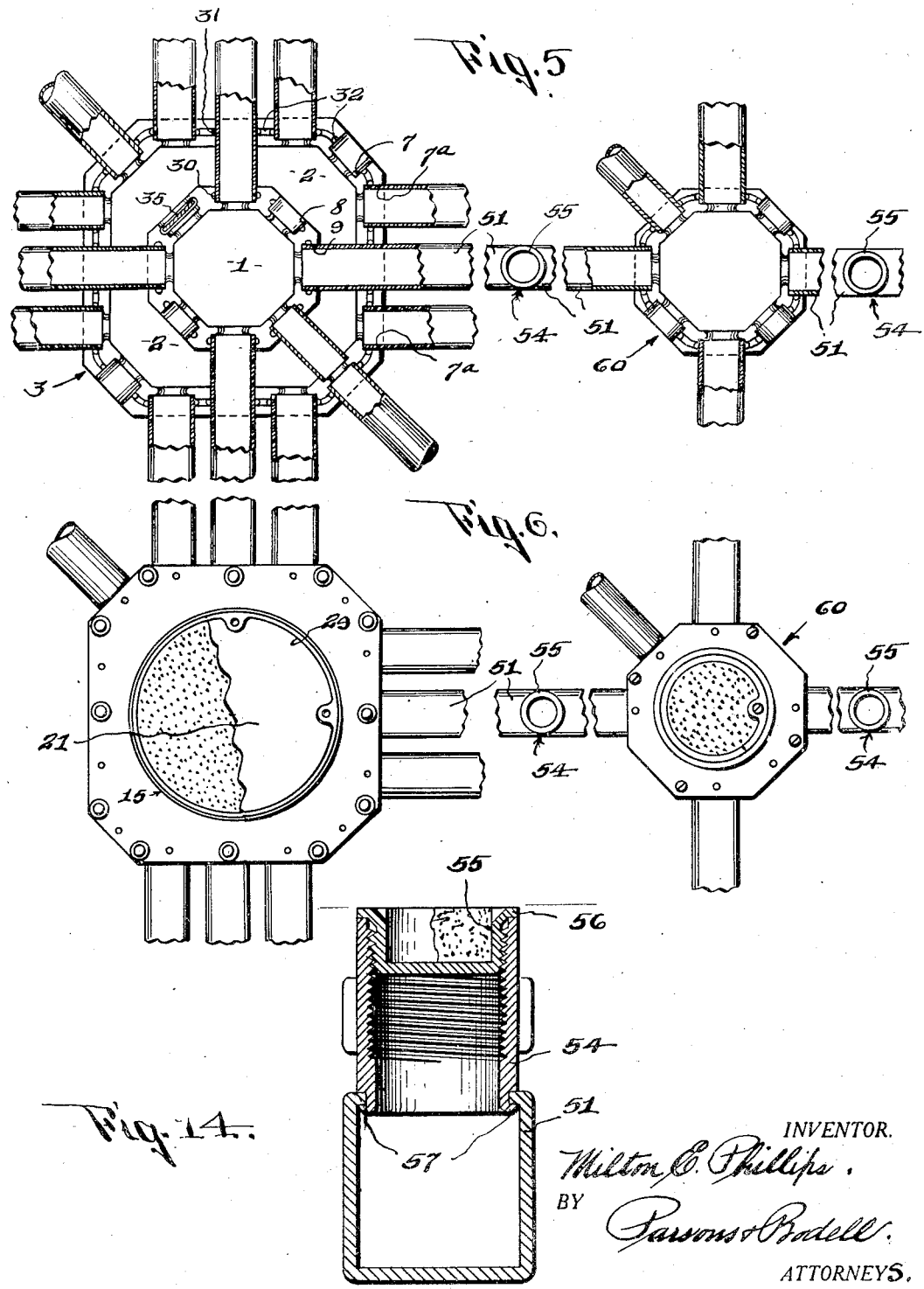

Patented Jan. 5, 1932

1,839,258

UNITED STATES PATENT OFFICE.

MILTON E. PHILLIPS, OF SYRACUSE, NEW YORK, ASSIGNOR TO CROUSE-HINDS COMPANY, OF SYRACUSE, NEW YORK, A CORPORATION OF NEW YORK

JUNCTION BOX FOR UNDER FLOOR SYSTEMS

Application filed December 12, 1928. Serial No. 325,432.

This invention relates to electric conduit systems such as are embedded in cement, concrete and analogous floors and wall constructions of modern fire proof buildings and has for its object, a particularly simple junction and outlet box of comparatively great capacity in proportion to its size with the compartments so arranged one within the other in the same plane that the box is of minimum thickness and at the same time, the wires readily accessible and the system flexible or capable of changes that may be necessary or desirable from time to time.

A further object is a junction box and system which is water tight and moisture proof and a box which is particularly simple and economical in construction and highly efficient in use.

The invention consists in the novel features and in the combinations and constructions hereinafter set forth and claimed.

In describing this invention, reference is had to the accompanying drawings in which like characters designate corresponding parts in all the views.

Figure 1 is a plan view partly in section, partly broken away of a junction box embodying my invention, the contiguous portions of the conduits of the system being also shown.

Figure 2 is a fragmentary sectional view on line 2—2, Figure 1.

Figures 3 and 4 are fragmentary sectional views on lines 3—3, 4—4, Fig. 1 respectively.

Figures 5 and 6 are respectively fragmentary plan views of a system, Figure 5 being partly in section and parts being removed and Figure 6 being partly broken away.

Figures 7 and 8 are respectively edge and face views of one of the adapters.

Figures 9 and 10 are similar views of another form of adapter.

Figure 11 is a fragmentary elevation, partly in section, illustrating the means for holding the box sections together.

Figures 12 and 13 are respectively an elevation and edge view of one of the removable partitions.

Figure 14 is a detail sectional view of one of the presets and adjacent conduit.

This junction box comprises, generally, inner and outer compartments arranged one within the other in the same plane, the side walls of the compartments being provided with passages for coupling electric conduits thereto with the conduit or conduits connected to the inner compartment extending through the outer compartment.

1 and 2 designates respectively the inner and outer compartments which are preferably concentrically located one within the other in the same plane, the outer wall of the inner compartment forming the inner wall of the outer compartment. Preferably the box is composed of upper and lower sections and the plane of division cuts the pipe-receiving passages transversely and preferably diametrically.

3 designates the lower section or base of the box.

The upper section is composed of inner and outer pieces 4 and 5 complemental to the inner and outer compartments 1, 2.

The outer piece 5 as here shown partly covers the upper open side of the compartment 2 and is formed with an upstanding annular flange 6 at its inner edge; and the inner piece 4 is located within the annular flange 6 and partly overhangs the outer compartment 2.

7, 7a designates the pipe receiving passages in the outer wall of the box, that is, the outer wall of the compartment 2.

8 and 9 designate the pipe receiving passages in the inner wall of the box, that is, the wall or partition separating the compartments 1, 2.

The outer wall in which the passages 7, 7a are provided is composed of a portion 10 provided on the lower section 3 and a portion 11 provided on the piece 5 of the upper section. The passages 8, 9 are likewise formed partly in the portion 12 of the inner wall of the box provided on the lower section or base 3 and partly in the portion 13 of the wall provided on the piece 4 of the upper section.

The box is here shown as rectangular or square in general outline with the corners of the square cut off so that the box is octagonal with four of its sides longer than the four remaining sides at the corners. The inner wall of the box, that is, the wall confining the inner compartment 1 is a true octagon.

The pipe receiving passages 7, 7a are formed in all sides of the box 3, three pipe receiving passages 7a being formed in each of the longer sides of the outer wall and one pipe receiving passage 7 in each of the short sides of the outer wall. The passages 7 in the short sides of the outer wall are alined with the passages 8 in the wall of the inner compartment 1 and the middle passage 7a in each of the longer sides of the box is alined with the passage 9 in the opposing or parallel side of the octagonal wall of the inner compartment 1.

Hence, some of the conduits can if desired, be run through the outer compartment into the inner compartment. The passages 7, 7a in the outer wall of the box are preferably square. The passages 9 of the wall of the inner compartment 1 are also preferably square while the passages 8 which are alined with the corner passages 7 of the outer wall are round.

15 is a collar or annular cover support adjustably mounted on the outer piece 5 of the upper section of the box, it being here shown as having a flange 16 enclosing the flange 6 of the outer piece 5 with its inner edge opposed to an annular groove 17 at the outer side of the base of the flange 6. The groove is for the purpose of receiving a sealing composition. The cover support 15 is adjustably secured to the piece 5 by suitable means as screws 18 extending through internal lugs 19 on the cover support 15 and threading into lugs 20 provided on the flange 6. By reason of the screws 18. the cover support 15 can be readily adjusted toward and from the box or the piece 5 in order to locate the upper or outer surface of the support flush with the floor surface or in any other desired relation to the surface of a floor or wall.

21 is a cover plate detachably mounted in the cover support 15, it being located in a countersink 22 formed in the upper end of the support or collar 15 and held in position in any suitable manner. It is here shown as held in position by means self-contained therewith as wedge nuts 23 on the inner side of the cover and screws 24 extending through the margin of the cover and threading into the wedge nut. The wedge nuts coact inclined plane fashion at 25 with lugs 26 on the inner face of the cover and thrust outwardly against the inner annular wall of the cover support 15. Obviously, tightening of the screws 24 will cause the wedge nuts 23 to be thrust laterally into snug engagement with the inner wall of the cover support 15.

A suitable gasket 27 is interposed between the margin of the cover 21 and an annular bearing face 28 on the cover support 15.

The surface of the margin of the cover is intended to be substantially flush with the edge of the cover support 15. The cover 21 is formed with a suitable recess or countersink 29 for receiving a filler so that when the box is mounted in position, all that is exposed on the surface of the floor or wall is an annular metallic ring. The filler may be of the same material as the floor surface, that is, cement or linoleum.

The pipe-receiving passages in the inner and outer walls are formed with circumferential internal grooves or passages 30 and 31, these grooves being formed partly in the lower and upper sections of the box and the meeting edges of the outer walls of the lower section 3 and the piece 5 of the upper section are formed with channels or ducts 32 connecting the passages 31.

The piece 5 of the upper section is provided with inlets 33 communicating with the internal grooves or channels 31. These internal grooves and channels and ducts in the outer walls are for the purpose of receiving a sealing composition and the inlets 33 are for the purpose of permitting the composition to be poured into the channels and ducts when the parts of the box are assembled. The grooves 30, 31 are also adapted to receive adapter plugs, Figures 7 and 8.

The adapters 34 comprise a tubular body provided with a square circumferential flange 41 for entering the groove 31 and grooves 30 of passages 9 when a round pipe is to be connected to a box instead of a square conduit. The adapter also has an internal flange 42 at its inner end forming an abutment for the end of the round pipe. The flange 41 loosely fits the groove or channels 31 so that the sealing compound can enter the groove around the flange. The adapter terminates short of the outer edge of the passage 7 or 7a in the outer wall of the box leaving a circumferential channel around the pipe at 76 for receiving a sealing compound.

When it is desired to extend a round conduit through the center openings of the outer wall of the compartment 2 to the inner wall, as shown at 40, Figure 1, the adapter 46, Figures 9, 10, is used. This adapter is similar to adapter 34 except that it has no internal flange or abutment for the conduit end. The adapter 46 is preferably made in halves while the adapter 34 may be made in one piece.

Also, in case it is desired to close any one of the openings, a closure plug 35 may be inserted in the grooves or channels 30 or 31. The closures 35 may be used to plug the openings 7, 7a in the outer walls and openings 8, 9 in the walls of the inner compartment.

As before stated, the openings 7 at the corners of the box are alined with the circular openings 8 of the wall of the inner compartment 1 and when a conduit is to be run through the outer compartment from the corner openings thereof to the inner compartment, a short length of conduit 47 is inserted in the passage 8 with its outer end laid in a passage 49 formed on the inner side of the corner portions of the outer wall, the passage 49 being formed partly in the base and in the upper section and it is so formed as to provide an internal abutment 50 for the outer end of the pipe section 47. The main conduits which lead to the compartments 1 and 2 are preferably square and each extends through the central pipe-receiving passages 7$^a$ in one of the long sides of the box into the alined square passage 9 of the wall of the inner compartment 1 as shown at 51, Figure 1.

Conduits in which presets for fixtures are located are square and branch conduits are round. The conduits are secured in position by suitable means as screws 61 so that when round pipes are used, they need not be threaded. Also, the set screws 61 form a good ground connection. When adapters are used, the set screw extends through radial holes 61$^a$ in the adapters, Figure 11, and thrust against the pipe.

In order to divide the compartment 2 into sub-compartments, opposing walls of the compartments 1, 2 are provided with slots 52 for receiving partition plates 53, these slots and plates being usually located in the lower section or base 3 under the conduits 51.

54 are presets mounted on the square conduits and these may be located in any desired position. Each comprises a tubular body extending at its inner end into an opening in the top of one of the square conduits and having its upper end located slightly below the floor surface and a plug in the form of an inverted cap 55 threading into the upper end of the tubular body, with an annular lip 56 overlying the upper edge of the tubular body 54, the upper edge of this lip being intended to be flush with the floor surface.

The inner end of the tubular body is secured in the opening of the square conduit by riveting or upsetting the inner end at 57 on the inner face of the wall of the conduit provided with the opening. The inverted cap which closes the upper end of the tubular body may be filled with a floor surface material. When a fixture is attached to the body 54, the cap is unscrewed and the fixture substituted therefor.

The outer piece 5 of the section of the box is secured to the base in any suitable manner as by screws 58. The inner piece 4 is not secured in position but is merely laid in position.

The compartments of the box are intended to be used for different classes of wires, for instance, one subdivision of the outer compartment 2 may be used for telephone wires, the other subdivision for light wires, while the inner compartment can be used for intercommunication wires as buzzers.

After the outer piece 5 of the upper section has been assembled, on the lower section by means as the screws 58, the central section 4 may be dropped in position and the cover support 15 adjusted to the proper height by means of the screws 18. The cover 21 is then secured in position. Owing to the screws 18, the cover support can be raised or lowered and thus, the upper surface of the box leveled and brought flush with the floor surface, and when linoleum is used on the floor, it can be adjusted to extend through the thickness of the linoleum. After the parts are adjusted, the sealing composition is poured between the sections of the box and between the cover support and the upper section 5 so that the box is moisture tight. Also, the cover 21 can be covered to the level of the floor with linoleum or cement.

Figure 5 represents a proposed floor layout, showing a junction connected by a conduit or square duct to a smaller or single compartment box of similar construction to the two compartment box already described. This single compartment box will be used as a junction box where only one branch or circuit is extended from the larger box. The lower half of the boxes are shown in Figure 5, and the conduits and ducts are shown partly in section.

Figure 6 represents the same lay-out as shown in Figure 5, with the boxes assembled. The recess 29 of cover 21 of the larger two compartment box is shown as partly filled with floor material as cement or linoleum. The cover on the smaller or single compartment box is shown as completely filled with floor material.

I claim:

1. A junction box having inner and outer concentric compartments, the side walls of the compartments being provided with means for coupling electric conduits respectively to the compartments, the box comprising upper and lower sections, and the line of division of the sections extending transversely of the conduit passages, the upper section comprising inner and outer pieces, the outer piece forming the top of the outer compartment and the inner piece forming the top of the inner compartment.

2. A junction box comprising inner and outer compartments located one within the other and in the same plane, the inner and outer walls being formed with conduit receiving passages, some of which are in alinement, some of the passages being square in cross section and others round and adapters insertable in the square passages and having openings for receiving the circular conduits.

3. A junction box comprising inner and outer compartments located one within the other, the outer wall being octagonal with four of its sides longer than the remaining four located between the long sides whereby the box is in the general form of a rectangle with the corners cut away, and the wall of the inner compartment being octagonal with its sides parallel to the sides of the outer wall, the internal wall being provided with a conduit opening in each side thereof and the outer wall being provided with three pipe receiving passages in the long sides thereof, the central passage of which is alined with the passage in the opposing internal wall and the short sides of the wall being each provided with a passage alined with the passage in the opposing side of the internal wall.

4. A junction box formed with a pipe receiving passage in the wall thereof, the box comprising upper and lower sections and the plane of division extending transversely of the passage, the box being formed with a channel extending circumferentially around said passage and opening thereinto, portions of the channel being located in both sections and an adapter member insertable in the passage and having a rib on its outer side for seating in said channel whereby different size and form of pipes may be received in said passage.

5. A junction box having inner and outer compartments located one within the other in the same plane, conduit receiving passages in the side walls of the compartments, the box comprising upper and lower sections and detachable partitions for dividing the outer compartment into sub-compartments, the partitions and the opposing walls of the compartments having means for interlocking and holding the partition in position.

6. A junction box having inner and outer compartments located one within the other in the same plane, conduit receiving passages in the side walls of the compartments, the box comprising upper and lower sections and detachable partitions for dividing the outer compartment into sub-compartments, the opposing walls of the compartments being formed with slots and partitions having their margins in the slots.

7. A junction box having inner and outer compartments located one within the other in the same plane, conduit receiving passages in the side walls of the compartments some of the passages in the walls of the compartment being arranged in alinement, the box comprising upper and lower sections and the plane of division between the sections also dividing the passages, conduits connected to the passages of the outer wall, one or more of said conduits extending through the alined passages of the outer and inner walls to communicate with the inner compartment, detachable partitions in the lower section of the outer compartment located below the conduits located in the alined openings.

8. A junction box having inner and outer compartments located one within the other, the side walls of the compartments being provided with passages for receiving electric conduits, the box comprising upper and lower sections, the plane of division between the sections extending transversely through the said passages, the upper section comprising inner and outer pieces, the outer piece being formed with a central opening in which the inner piece is located, the inner piece constituting a removable cover for the inner and outer compartments, a cover support mounted on the outer piece and a second cover carried by the cover support and means for securing the second cover in position.

9. A junction box having inner and outer compartments located one within the other, the side walls of the compartments being provided with passages for receiving electric conduits, the box comprising upper and lower sections, the plane of division between the sections extending transversely through the said passages, the upper section comprising inner and outer pieces, the outer piece being formed with a central opening in which the inner piece is located, the inner piece constituting a removable cover for the inner and outer compartments, a cover support mounted on the outer piece and a second or top cover carried by the support, means for securing the second or top cover in position, and means for securing the cover support to the outer piece and adjusting it toward and from the same.

10. A junction box having inner and outer compartments located one within the other, the side walls of the compartments being provided with passages for receiving electric conduits, the box comprising upper and lower sections, the plane of division between the sections extending transversely through the said passages, the upper section comprising inner and outer pieces, the outer piece being formed with a central opening in which the inner piece is located, said inner piece constituting a cover for the inner and outer compartments, a top cover support mounted on the outer piece and a top cover carried by the cover support, means for securing the top cover in position and means for securing the top cover support to the outer piece and adjusting it toward and from the same, the top cover support being formed with a countersink and the top cover being mounted on the bottom of the countersink below the plane of the outer edge of the top cover support.

11. A junction box having inner and outer compartments located one within the other, the side walls of the compartments being provided with passages for receiving electric conduits, the top wall of the box having an opening of greater diameter than the inner compartment, a cover member for the inner compartment and of greater diameter than the inner compartment, whereby the margin of the cover overlaps the other compartment and forms a closure to the entrance of the outer compartment, a support for a top cover mounted on the box around said opening, and a top cover detachably mounted on the cover support.

12. A junction box having inner and outer compartments located one within the other, the side walls of the compartments being provided with passages for receiving electric conduits, the top wall of the box having an opening of greater diameter than the inner compartment, a cover member for the inner compartment and of greater diameter than the inner compartment, whereby the margin of the cover overlaps the other compartment and forms a closure to the entrance of the outer compartment, a support for a top cover mounted on the box around said opening, a top cover detachably mounted on the cover support, and means for securing the cover support to the box and for adjusting it toward and from the box.

13. A junction box having inner and outer compartments located one within the other, the side walls of the compartments being provided with passages for receiving electric conduits, the top wall of the box having an opening of greater diameter than the inner compartment, a cover member for the inner compartment and of greater diameter than the inner compartment, whereby the margin of the cover overlaps the other compartment and forms a closure to the entrance of the outer compartment, a support for a top cover mounted on the box around said opening, and a top cover detachably mounted on the cover support, the top cover support being formed with a countersink and the top cover being mounted in the countersink below the plane of the top edge of the cover support.

14. A junction box having inner and outer compartments located one within the other, the side walls of the compartments being provided with passages for receiving electric conduits, the top wall of the box having an opening of greater diameter than the inner compartment, a cover member for the inner compartment and of greater diameter than the inner compartment, whereby the margin of the cover overlaps the other compartment and forms a closure to the entrance of the outer compartment, a support for a top cover mounted on the box around said opening, a top cover detachably mounted on the cover support, and means for securing the cover support to the box and for adjusting it toward and from the box, the last mentioned means consisting of screws located within the top cover support and extending through lugs in the top cover support and threaded into the box.

In testimony whereof, I have hereunto signed my name, at Syracuse, in the county of Onondaga, and in the State of New York, this 30th day of November, 1928.

MILTON E. PHILLIPS.